United States Patent [19]

Elijah

[11] Patent Number: 5,307,914
[45] Date of Patent: May 3, 1994

[54] METHOD AND MEANS FOR CONTROLLING TORQUE AMPLIFIER

[76] Inventor: Jerry E. Elijah, 209 Eighth St., Tipton, Iowa 52772

[21] Appl. No.: 979,308

[22] Filed: Nov. 20, 1992

[51] Int. Cl.⁵ .......................................... F16D 25/00
[52] U.S. Cl. ................... 192/87.13; 192/3.57; 192/48.1; 192/87.18
[58] Field of Search ............... 192/87.1, 87.13, 87.14, 192/87.18, 52, 48.1, 3.57

[56] References Cited

U.S. PATENT DOCUMENTS

| | | | |
|---|---|---|---|
| 2,505,450 | 4/1950 | Wemp | 192/87.13 |
| 3,163,270 | 12/1964 | Zingshem | 192/87.13 X |
| 3,602,344 | 8/1971 | Clark | 192/3.27 |
| 3,762,518 | 10/1973 | Hilpert | 192/87.13 |
| 4,298,106 | 11/1981 | Elijah | 192/3.57 |
| 4,376,473 | 3/1983 | Tomasek et al. | 192/87.18 X |

Primary Examiner—Rodney H. Bonck
Assistant Examiner—Andrea Pitts
Attorney, Agent, or Firm—Zarley, McKee, Thomte, Voorhees & Sease

[57] ABSTRACT

A control system for a drive train having a direct drive clutch and a torque amplifier clutch includes a master control for alternating between direct drive and torque amplifier positions for actuation of the direct drive clutch and the torque amplifier clutch respectively. When the master control moves from its direct drive position to its torque amplifier position a first delay control keeps the direct drive clutch engaged until the torque amplifier clutch is fully engaged. When the master control moves from its torque amplifier position to its direct drive position a second delay control keeps the torque amplifier clutch engaged until the direct drive clutch is fully engaged.

4 Claims, 10 Drawing Sheets

METHOD AND MEANS FOR CONTROLLING TORQUE AMPLIFIER

BACKGROUND OF THE INVENTION

This invention relates to a method and means for controlling a torque amplifier.

Many present farm tractors include a torque amplifier assembly which is located between the main engine clutch and the transmission of the tractor. The torque amplifier permits the operator to engage a torque amplifier gear when a desired increase in torque is required. The increase in torque can be accomplished with the torque amplifier without disengaging the clutch or shifting the gears in the transmission.

The torque amplifier assembly includes a first shaft which is coupled to the engine output shaft by means of the main clutch. The first shaft includes a torque amplifier gear and a direct drive gear thereon. These gears interlock with complimentary gears on a second shaft which in turn is connected to the transmission of the vehicle.

A direct drive clutch and a torque amplifier clutch are connected to the first shaft. The torque amplifier clutch can be activated to cause rotation to be imparted from the first shaft to the direct drive gear, and the torque amplifier clutch can be actuated to transfer rotation from the first shaft to the torque amplifier gear.

The torque amplifier clutch and the direct drive clutch of prior art systems are connected to hydraulic circuitry which permits the hydraulic pressure to be directed either to the direct drive clutch or the torque amplifier clutch. A switch or valve permits the hydraulic circuitry to be changed so as to transfer the hydraulic pressure to either the direct drive clutch or the torque amplifier clutch.

A problem is encountered with present torque amplifier assemblies whenever the operator changes from the direct drive mode to the torque amplifier mode or whenever the operator changes from the torque amplifier mode back to the direct drive mode. During this transfer there is usually a lurch in the drive train of the tractor resulting from the momentary deactuation of both of the direct drive and the torque amplifier clutches. For example, when the operator switches from the direct drive to the torque amplifier mode, the direct drive clutch is immediately disengaged before the torque amplifier clutch becomes fully engaged. This is because there is a short period of time required for hydraulic pressure to build within the torque amplifier clutch from 0 psi to the amount of pressure required to activate the torque amplifier clutch. When the torque amplifier clutch finally engages, there is a jerk or lurch in the transmission.

Therefore, a primary object of the present invention is the provision of an improved method and means for controlling the torque amplifier.

A further object of the present invention is the provision of an improved method and means for controlling the torque amplifier wherein both the torque amplifier clutch and the direct drive clutch are simultaneously actuated for a short period of time during transfer from one clutch to the other until such time as hydraulic pressure has built up in the transferee clutch at which time the transferor clutch is deactuated.

A further object of the present invention is the provision of a control system for a torque amplifier which can be easily mounted upon existing torque amplifier systems.

A further object of the present invention is the provision of an improved method and means for controlling torque amplifiers which is efficient in operation, simple in construction, and durable and reliable in use.

SUMMARY OF THE INVENTION

The foregoing objects are achieved by an improved control system for a drive train comprising a direct drive clutch and a torque amplifier clutch, each of which is biased to a disengaged position and each of which is movable to an engaged position in response to the introduction of fluid pressure. The control system includes a fluid pressure source and first and second valves connected to the fluid pressure source. Each valve is spring loaded to an open position, and includes a solenoid which can be actuated to move the valve to its closed position against the spring bias. The first valve is connected to the direct drive clutch, and when actuated to move to its open position causes the direct drive clutch to become engaged. The second valve is connected to the torque amplifier clutch and is movable to its open position upon actuation of the solenoid so as to cause fluid pressure to be introduced to the torque amplifier clutch, thereby causing the torque amplifier clutch to become engaged.

A master control circuit is connected to both of the first and second valves and includes a master switch which is movable between a torque amplifier position and a direct drive position. The master switch, when in the direct drive position, causes actuation of the solenoid of the first valve so as to cause the direct drive clutch to become engaged. When the master switch is moved to its torque amplifier position, it causes the second valve to be actuated so as to cause the torque amplifier clutch to become engaged.

A first delay circuit is connected to the first valve and is adapted to maintain the first valve in its open position after the master switch has been switched to its torque amplifier position. The first delay circuit, however, includes a pressure switch which is adapted to sense the fluid pressure within the torque amplifier clutch. When that fluid pressure reaches 80 psi, the pressure switch causes the first delay control circuit to deactuate the direct drive clutch.

A second delay circuit is connected to the second valve and includes a pressure switch for sensing the fluid pressure within the direct drive clutch. When the master switch is moved from the torque amplifier position to the direct drive position, the second delay circuit maintains the second valve in its open position so as to continue to maintain the torque amplifier clutch in its engaged position. When the pressure within the direct drive clutch reaches 80 psi, the pressure switch of the second delay circuit causes the second delay circuit to deactuate the second valve thereby causing the torque amplifier to become disengaged.

The result of the foregoing control system is that a smooth transition occurs whenever a transfer is made between the torque amplifier clutch to the direct drive clutch or vice versa. The one clutch which is being disengaged remains engaged until the hydraulic pressure in the other clutch has reached 80 psi. By accomplishing the smooth transition, the present invention makes the torque amplifiers of existing farm tractors smoother in operation and safer by minimizing jerking

DETAILED DESCRIPTION OF THE DRAWINGS

Figure 1:
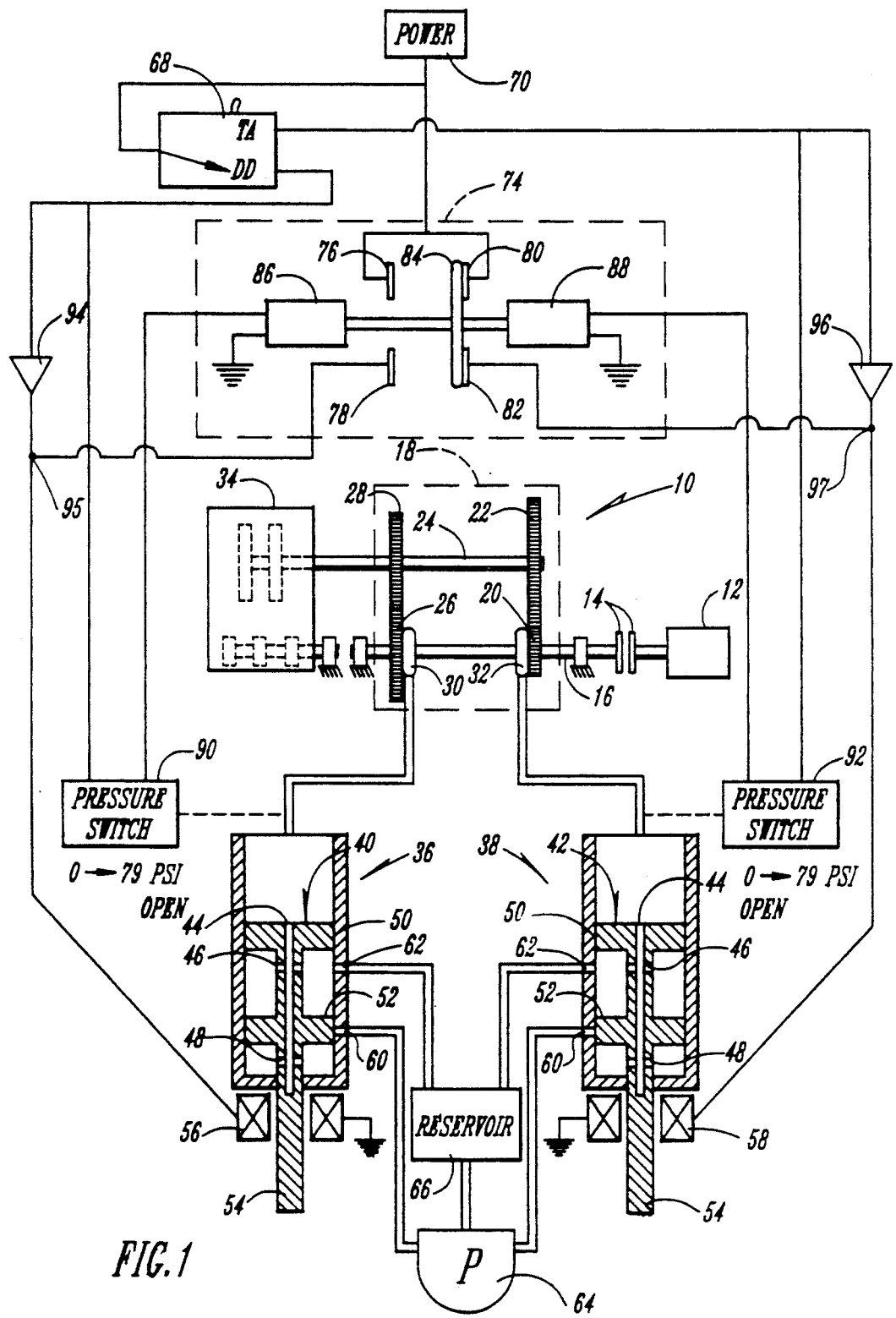
FIG. 1 is a schematic view of the torque amplifier system of the present and the control system therefore.

Referring to FIG. 1 of the drawings, the numeral 10 generally designates a drive train containing the torque amplifier system of the present invention. Drive train 10 includes an engine 12 which drives a main clutch 14 connected to a drive shaft 16. Drive shaft 16 extends within a torque amplifier assembly 18 having a torque amplifier gear 20 and a direct drive gear 26 rotatably mounted thereon. Engaging torque amplifier gear 20 is a complimentary torque amplifier gear 22 which is fixed to a transmission shaft 24. Also fixed to transmission shaft 24 is a complimentary direct drive gear 28 which meshes with direct drive gear 26 on drive shaft 16.

A direct drive clutch 30 is adapted to move from a disengaged position permitting direct drive gear 26 to rotate freely on drive shaft 16 to an engaged position which fixes direct drive gear 26 to shaft 16. Similarly, a torque amplifier clutch 32 is adapted to move from a disengaged position permitting torque amplifier gear 20 to rotate freely on shaft 16 to an engaged position fixing torque amplifier gear 20 to shaft 16.

Transmission shaft 24 extends into a transmission 34. When direct drive clutch 30 is engaged, the power train passes from drive shaft 16 through direct drive gears 26, 28 to transmission shaft 24. When torque amplifier clutch 32 is engaged, the drive train passes from drive shaft 16 through torque amplifier gears 20, 22 to transmission shaft 24.

Both direct drive clutch 30 and torque amplifier clutch 32 are hydraulically operated, and are spring biased to their disengaged position. Upon being introduced to hydraulic pressure of a predetermined magnitude, the direct drive clutch 30 and the torque amplifier clutch 32 move to their actuated or engaged positions.

A direct drive valve 36 is hydraulically connected to direct drive clutch 30 for controlling the movement of direct drive clutch 30 between its engaged and disengaged positions. Similarly, a torque amplifier valve 38 is connected to torque amplifier clutch 32 for the same purpose. Direct drive valve 36 and torque amplifier valve 38 include similar parts, and corresponding parts have been assigned the same numerals. Within direct valve 36 is a direct drive spool 40 and within torque amplifier valve 38 is a torque amplifier spool 42. Extending within spools 40, 42 is an axial bore 44 which opens at its upper end. A first group of radial ports 46 extends radially in to spools 40, 42 for communication with the axial bore 44. A second set of radial ports 48 also extends radially in for communication with axial bore 44. Spools 42, 44 each include a first spool landing 50 and a second spool landing 52 which engage the interior surface of valves 36, 38. Spools 40, 42 also each include a spool stem 54 extending downwardly through the lower end of valves 36, 38 for axial sliding movement therein.

A direct drive solenoid coil 56 surrounds spool stem 54 of valve spool 40 and a torque amplifier solenoid coil 58 surrounds spool stem of torque amplifier spool 42.

A hydraulic pressure port 60 extends through the walls of valves 36, 38 and a hydraulic return port 62 also extends through the walls of valves 36, 38. A hydraulic pump 64 is connected to the pressure ports 60 and a hydraulic reservoir 66 is connected to the return ports 62 and also to pump 64.

The positions of valve spools 40, 42 shown in FIG. 1 show the valves 36, 38 in their closed positions. In these positions, spool landings 52 of valves 36, 38 block ports 60 and prevent fluid pressure from being introduced to clutches 30, 32.

Figure 2:
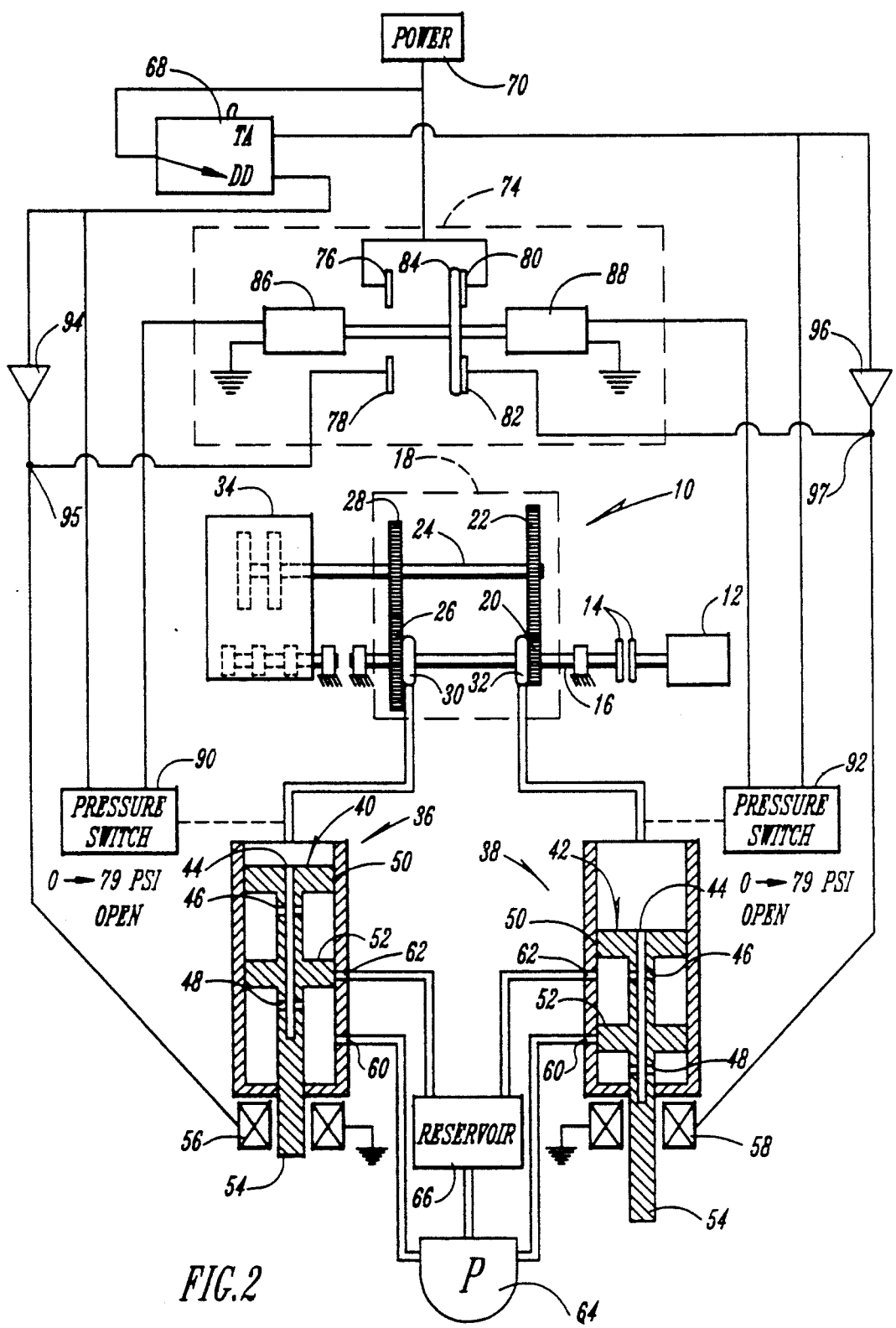
FIG. 2 is a schematic view similar to FIG. 1, but showing the state of the control system during the time that the direct drive clutch is being actuated and is experiencing from 0 to 79 psi fluid pressure.

FIG. 2 shows the direct drive valve 36 in its open position, wherein the lands 52 close off the return ports 62. Fluid pressure is permitted to pass through port 60 of valve 36, then through radial ports 48 and axial bore 44 to direct drive clutch 30. The valve spool 40 is moved from its closed position shown in FIG. 1 to its open position shown in FIG. 2 by the actuation of the solenoid coil 56.

Figure 4:
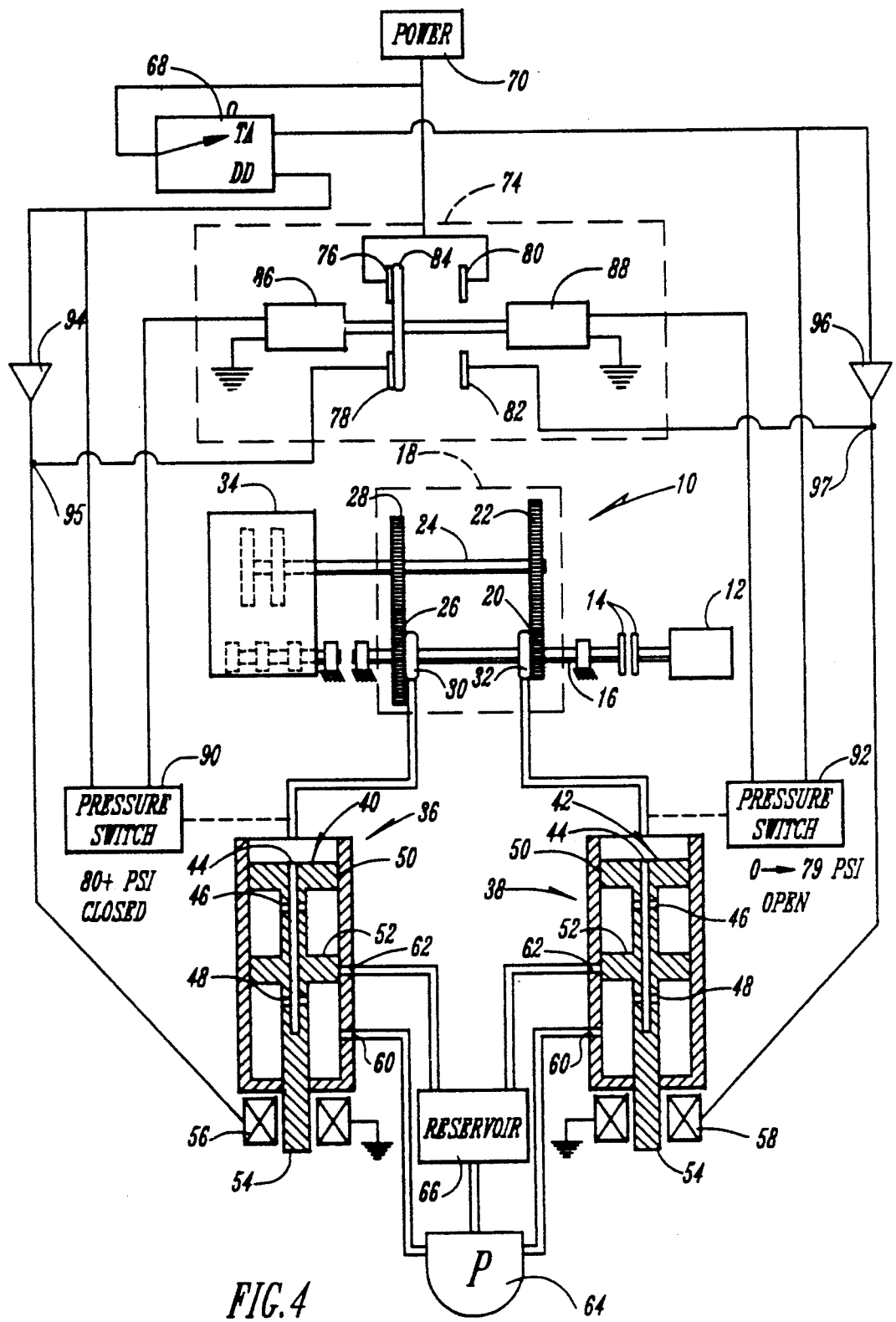
FIG. 4 is a view similar to FIG. 3, but showing the master switch having been transferred from the direct drive position to the amplifier position and showing the torque amplifier clutch being exposed from 0 to 79 psi fluid pressure.

FIG. 4 shows both the direct drive valve 36 and the torque amplifier valve 38 in their closed position for actuating both the direct drive clutch and the torque amplifier clutch.

An electrical master switch 68 is connected to a power source 70, and is movable between a torque amplifier position and a direct drive position. In FIG. 1, the master switch 68 is shown in its direct drive position. The direct drive output of master switch 68 is connected directly to the solenoid coil 56 of the direct drive valve 36. The torque amplifier output from master switch 68 is directly connected to the solenoid coil 58 of torque amplifier valve 38. Also connected to the electrical power supply 70 in parallel with the master switch 68 is a latching relay 74. Relay 74 includes fixed contacts 76, 78, 80, 82 and a movable contact 84. Contact 84 is movable from its first position shown in FIG. 1 wherein it forms an electrical connection between contacts 80, 82 to its second position shown in FIG. 3 wherein it forms an electrical connection between fixed contacts 76, 78. Fixed contacts 76, 80 are directly connected to power source 70. Fixed contact 78 is connected to the electrical line leading from the direct drive output of master switch 68 to the direct drive solenoid coil 56. Fixed contact 82 is directly connected to the line leading from the torque amplifier output of master switch 68 to the torque amplifier solenoid coil 58. Movable contact 84 is movable between its first and second positions by means of two relay coils 86, 88. Actuation of relay coil 86 causes movable contact 84 to be drawn from its first position shown in FIG. 1 to its second position shown in FIG. 3. Actuation of relay coil 88 causes the movable contact 84 to be moved from its second position shown in FIG. 3 to its first position shown in FIG. 1. The movable contact 84 is of the "latching" type which means it remains in either its first or second position until such time as one of the relay coils 86, 88 is actuated.

A first pressure switch 90 is connected between the relay coil 86 and the direct drive output of master switch 68. Pressure switch 90 is also connected to the hydraulic circuitry between direct drive valve 36 and direct drive clutch 30 so as to sense the hydraulic pressure therein. The pressure switch 90 is adapted to normally be in an open position. However, when pressure switch 90 senses fluid pressure of 80 psi or more, it moves from its open position to its closed position. Thus, when the pressure being delivered to direct drive clutch 30 is less than 80 psi, the pressure switch 90 is open, but when the pressure being delivered to direct drive 30 reaches or exceeds 80 psi, then pressure switch 90 is moved to its closed position thereby actuating the relay coil 86.

Similarly, a second pressure switch 92 is connected between the relay coil 88 and the torque amplifier output of master switch 68. Pressure switch 90 is connected to the hydraulic circuitry so as to sense the hydraulic fluid pressure being delivered to torque amplifier clutch 32. When the fluid pressure being delivered to torque amplifier clutch 32 is less than 80 psi, pressure switch 92 is in its open position, but when the fluid pressure being delivered to clutch 32 equals or exceed 80 psi, the pressure switch 92 is moved to its closed position thereby actuating the relay coil 88.

The various stages of operation of the control system are shown in FIGS. 1-5.

FIG. 1 shows the initial condition of the circuitry as the engine of the tractor is initially turned on. In this position, the master switch 68 is shown to be in the direct drive position. The movable contact 84 is shown to be in its first position forming electrical contact between fixed contacts 80, 82. However, it is also possible at the initial operation of the device that the contact 84 might be in its second position forming electrical contact between fixed contacts 76, 78. Pressure switches 90, 92 are initially sensing 0 psi fluid pressure being delivered to the clutches 30, 32. Because master switch 68 is in its direct drive position, electrical power is delivered directly to the direct drive solenoid 56 which causes the direct drive spool 40 to be moved from its closed position shown in FIG. 1 to its open position shown in FIG. 2. This causes hydraulic pressure to build within direct drive clutch 30. When the pressure is building from 0 to 79 psi, pressure switch 90 remains in its normally open position, thereby preventing actuation of the relay coil 86.

Figure 3:
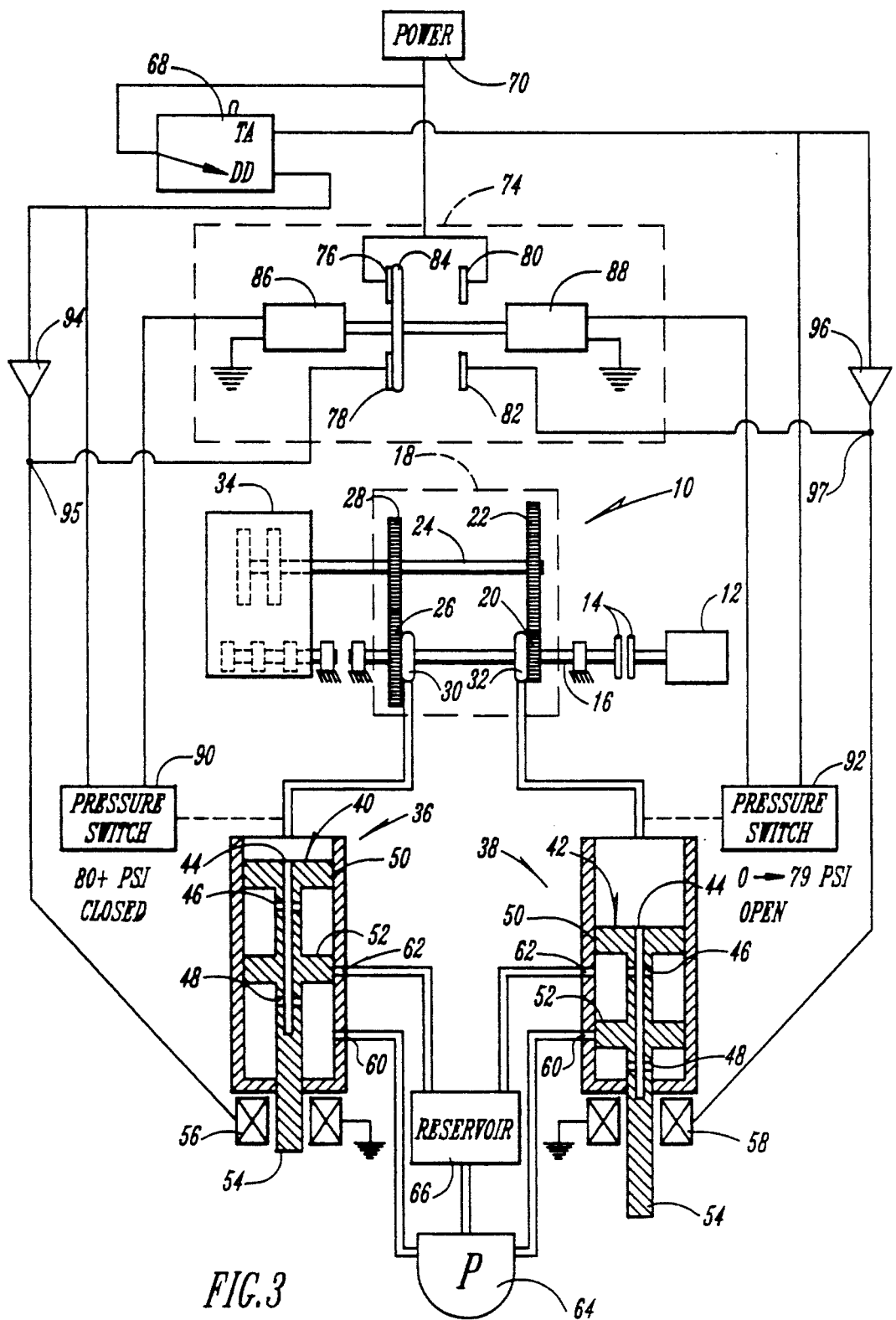
FIG. 3 is a view similar to FIG. 2, but showing the condition of the control system after the direct drive clutch has been engaged an exposed to fluid pressure greater than 80 psi.

FIG. 3 shows the condition of the circuitry after the pressure being delivered to the direct drive clutch has built up to 80 psi or more. At this point, the pressure switch 90 moves to its closed position thereby actuating relay coil 86 and causing the movable contact 84 to be drawn to the left to its second position shown in FIG. 3. During all this time, the torque amplifier valve 38 remains in a deactuated condition and the pressure switch 92 remains in an open position because the fluid pressure within torque amplifier clutch 38 is less than 80 psi.

FIG. 4 shows the initial condition of the circuitry when the master switch 68 is moved from its direct drive position to its torque amplifier position. In this condition, the movable contact 84 remains an electrical contact between fixed contacts 76, 78, thereby delivering electrical power to the solenoid coil 56. Consequently, the direct drive clutch 30 remains engaged even though the master switch 68 has been transferred from its direct drive position to its torque amplifier position. However, movement of switch 68 to its torque amplifier position actuates the torque amplifier solenoid 58 so as to cause the spool 42 of torque amplifier valve 38 to move to its open position. This causes the introduction of fluid pressure to the torque amplifier clutch 32. So long as the fluid pressure being delivered to the torque amplifier clutch 32 has not yet reached 80 psi, the pressure switch 92 remains in its open position thereby preventing the actuation of relay coil 88. Thus, both the first and second valves 36, 38 remain in their open positions while the fluid pressure delivered to torque amplifier clutch 32 is building from 0 psi to 79 psi.

Figure 5:
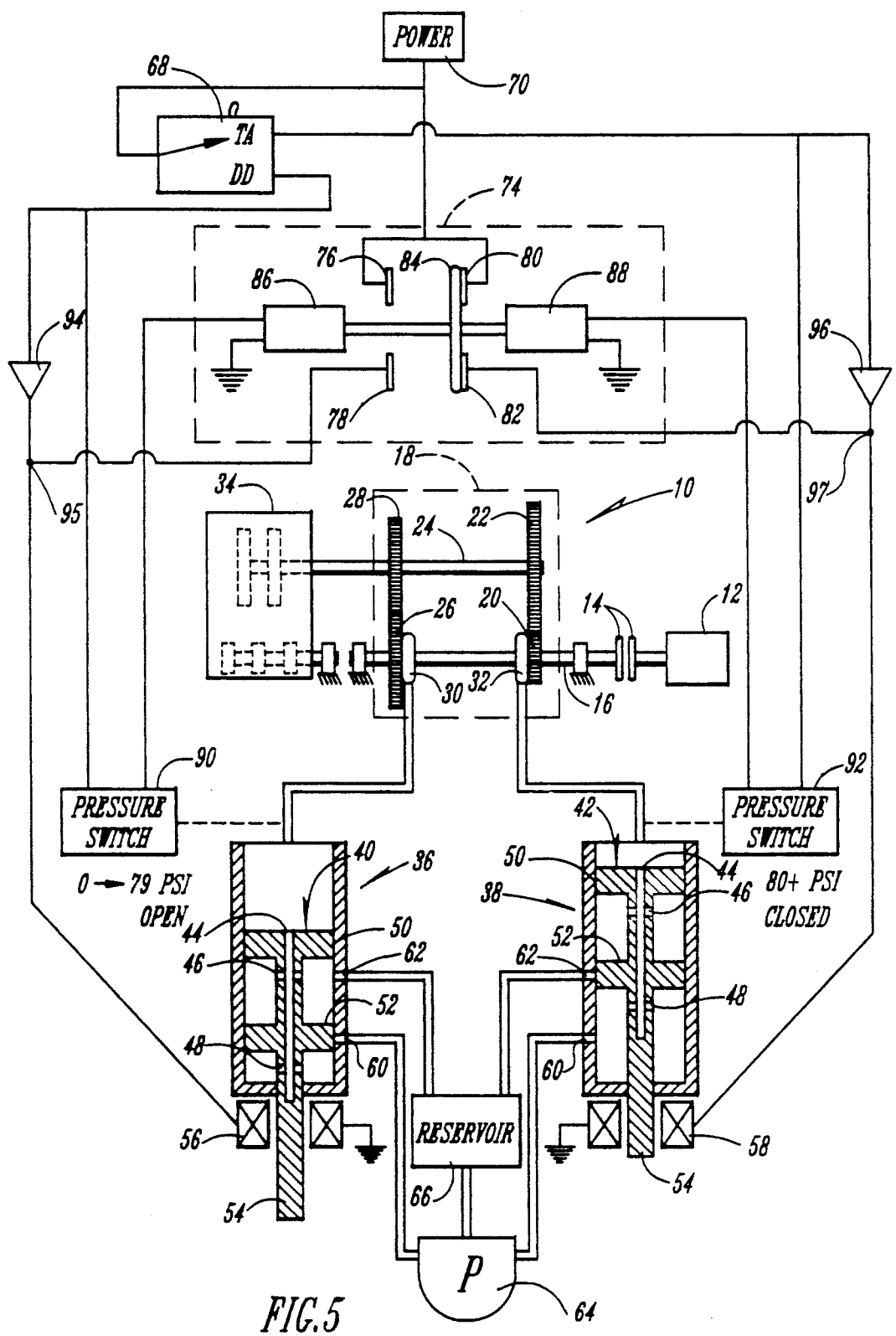
FIG. 5 is a view similar to FIGS. 2-4, but showing the torque amplifier clutch fully engaged and exposed to greater than 80 psi pressure.

FIG. 5 illustrates the condition of the circuitry after the fluid pressure being delivered to the torque amplifier clutch reaches 80 psi. At that time, the pressure switch 92 moves to its closed position thereby actuating relay coil 88 and causing the movable contact 84 to move from its second position shown in FIG. 4 to its first position shown in FIG. 5. This causes the cessation of delivery of electrical power to the direct drive solenoid 56 thereby causing the valve 36 to return by spring action to its closed position shown in FIG. 5. The pressure switch 90 then returns to its open position by virtue of the drop in fluid pressure to the direct drive clutch 30.

A pair of diodes 94, 96 are shown in the circuitry between the master switch 68 and the connections 95, 97 respectively, leading from contacts 78, 82. This prevents the current flow from contacts 78, 82 through pressure switches 90, 92 back to the coils 86, 88.

When the master switch 68 is returned from its torque amplifier position shown in FIG. 5 to its direct drive position, the torque amplifier clutch continues to be actuated by virtue of the fact that movable contact 84 is in its first position shown in FIG. 5. Only after the fluid pressure within the direct drive clutch 30 builds to 80 psi or more will the pressure in the direct drive clutch above pressure switch 90 move to its closed position thereby actuating relay 86 and moving the movable contact 84 to its left hand second position shown in FIG. 3. At that point the torque amplifier solenoid 58 is deactuated and the spool 42 of the torque amplifier valve 38 moves to its closed position disengaging torque amplifier clutch 32.

By keeping both clutches engaged for a short time in the transitional movement from one gear to another, it is possible to prevent the jerking action which occurs with present devices. Instead a smooth transition is achieved when moving from either the torque amplifier clutch to the direct drive clutch, or from the direct drive clutch to the torque amplifier clutch.

Referring to FIGS. 6–10, a modified control system is shown and is designated by the numeral 98. Control system 98 includes a master switch 100 which is movable between a direct drive position and a torque amplifier position. When master switch 100 is in the direct drive position, it is directly connected to the solenoid of the direct drive clutch valve 36 causing the direct drive clutch 30 (not shown in FIGS. 6–10) to be engaged. When the master switch 100 is in the torque amplifier position it is directly connected to the torque amplifier clutch valve 38 for engaging the torque amplifier clutch 32 (not shown in FIGS. 6–10).

Control system 98 includes a first relay system 102 and a second relay system 104. These relay systems differ from the relay system 74 shown in FIG. 1 in that the relays are spring biased toward one position, and will only move to their other position in response to being actuated. Immediately upon deactuation, the relays 102, 104 return to their original condition. In contrast, the relay 74 shown in FIGS. 1–5 remains in whatever condition it happens to be in until such time as it is actuated at which time the movable contact 84 moves to its other position.

Figure 6:
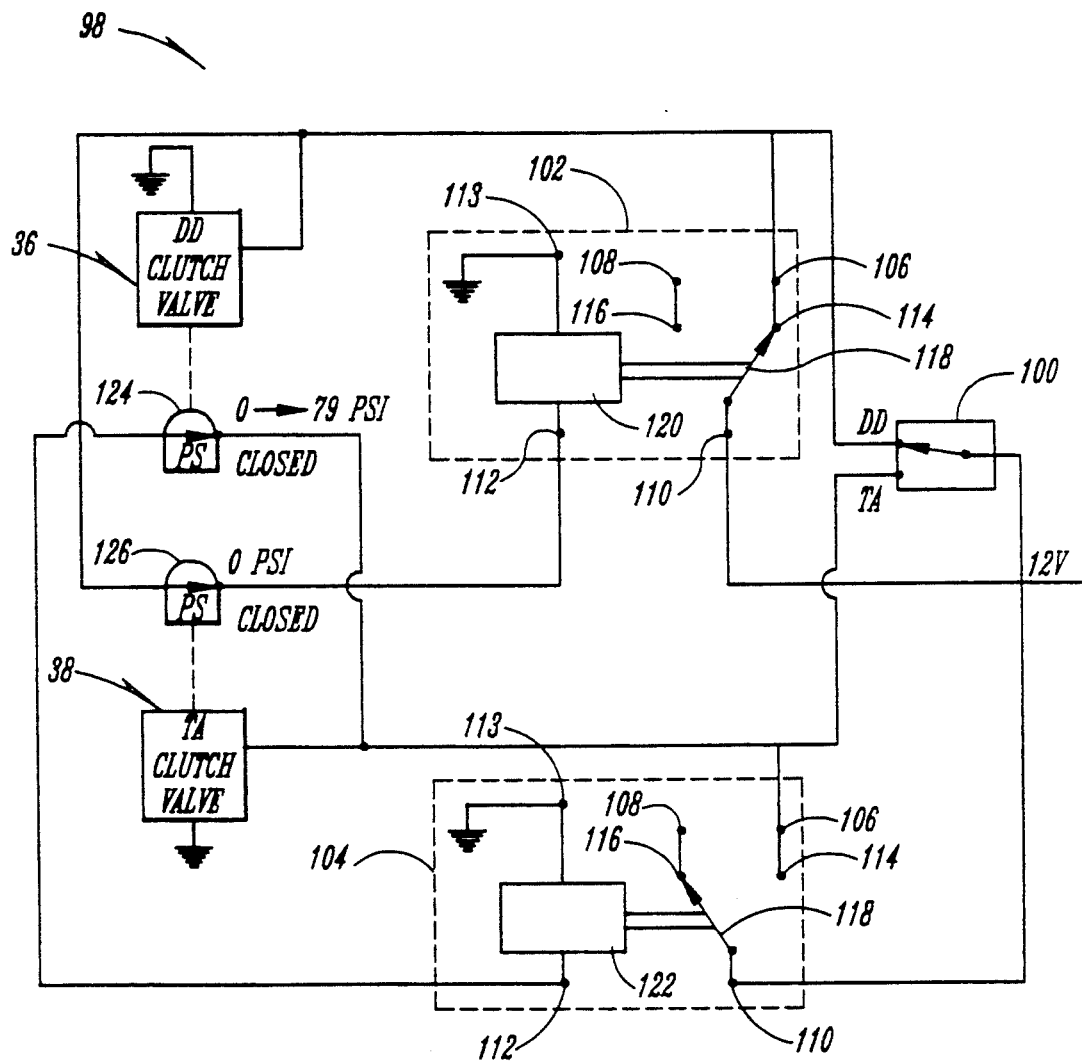
FIG. 6 is a schematic view showing a modified form of the invention with the master switch being initially positioned in its direct drive position and with the direct drive clutch being exposed to from 0 to 79 psi fluid pressure.

Relays 102, 104 each include a plurality of relay connections 106, 108, 110, 112, a pair of fixed contacts 114, 116, and a movable contact 118 which is adapted to move between contacts 114, 116. Relay 102 includes a relay coil 120 and relay 104 includes a relay coil 122. Relay coil 122 in FIG. 6 is shown in a deactuated state, with the movable contact 118 being in an open position contacting fixed contact 116. Relay valve 120 in FIG. 6 is shown in an actuated condition moving the movable contact 118 into electrical contact with the fixed contact 114. Both solenoids 120, 122 can be actuated to move the movable contact 118 into contact with fixed contact 114, and both coils 120, 122 can be deactuated to permit the movable contact 118 to return by virtue of its spring biasing into contact with fixed contact 116.

A first pressure switch 124 is electrically connected between relay coil 122 and the torque amplifier output of master switch 100. Switch 124 is also connected to direct drive clutch valve 36 for sensing the fluid pressure being delivered to the direct drive clutch 30. Switch 124 is normally in a closed position (as opposed to the pressure switches 90, 92 in FIGS. 1–5 which are normally in their open position), and is adapted to move to its open position at the time that it senses fluid pressure of 80 psi or more being delivered to the direct drive clutch valve 36.

A second pressure switch 126 is connected between the relay coil 120 and the direct drive output from master switch 100. Pressure switch 126 is also connected to torque amplifier clutch valve 38 for sensing the fluid pressure being delivered to the torque amplifier clutch 32. Switch 126 is normally in a closed position, and moves to an open position in response to sensing 80 psi fluid pressure being delivered to the torque amplifier clutch 32.

In operation, when the master switch 100 is initially moved to the direct drive position, it delivers electrical power directly to the direct drive clutch valve 36 thereby actuating the direct drive clutch 30. At the same time, because pressure switch 126 is normally in a closed position, the electrical current from the direct drive output of master switch 100 is delivered to the relay coil 120 thereby actuating relay coil 120 and causing movable contact 118 to move to its closed position in contact with fixed contact 114. Movable contacts 118 of both the relays 102, 104 are connected directly to the 12 volt power supply. In the condition shown in FIG. 6, the pressure being delivered to direct drive clutch valve 36 is between 0 and 79 psi, and accordingly, the pressure valve 124 is in its normally closed position.

Figure 7:
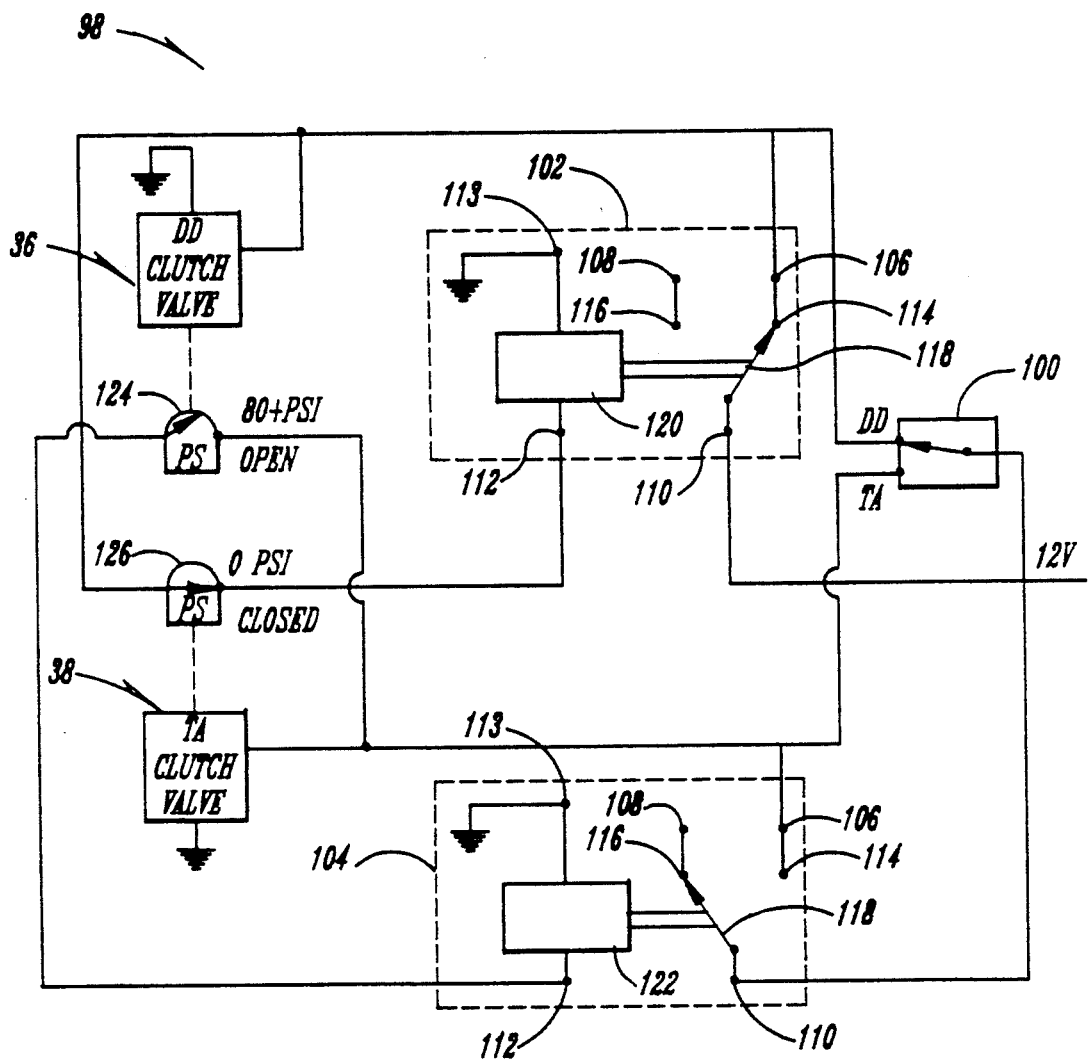
FIG. 7 is a view similar to FIG. 6, but showing the condition of the control circuit which the master switch in the direct drive position and with the fluid pressure within the direct drive clutch exceeding 80 psi.

FIG. 7 shows the condition of the circuitry after the fluid pressure being delivered to the direct drive clutch has reached 80 psi or greater. At this point, the pressure switch 124 is moved from its closed position to its open position. The pressure switch 126, being normally in its closed position, continues to activate the relay coil 120 thereby keeping the movable contact 118 in its closed position.

Figure 8:
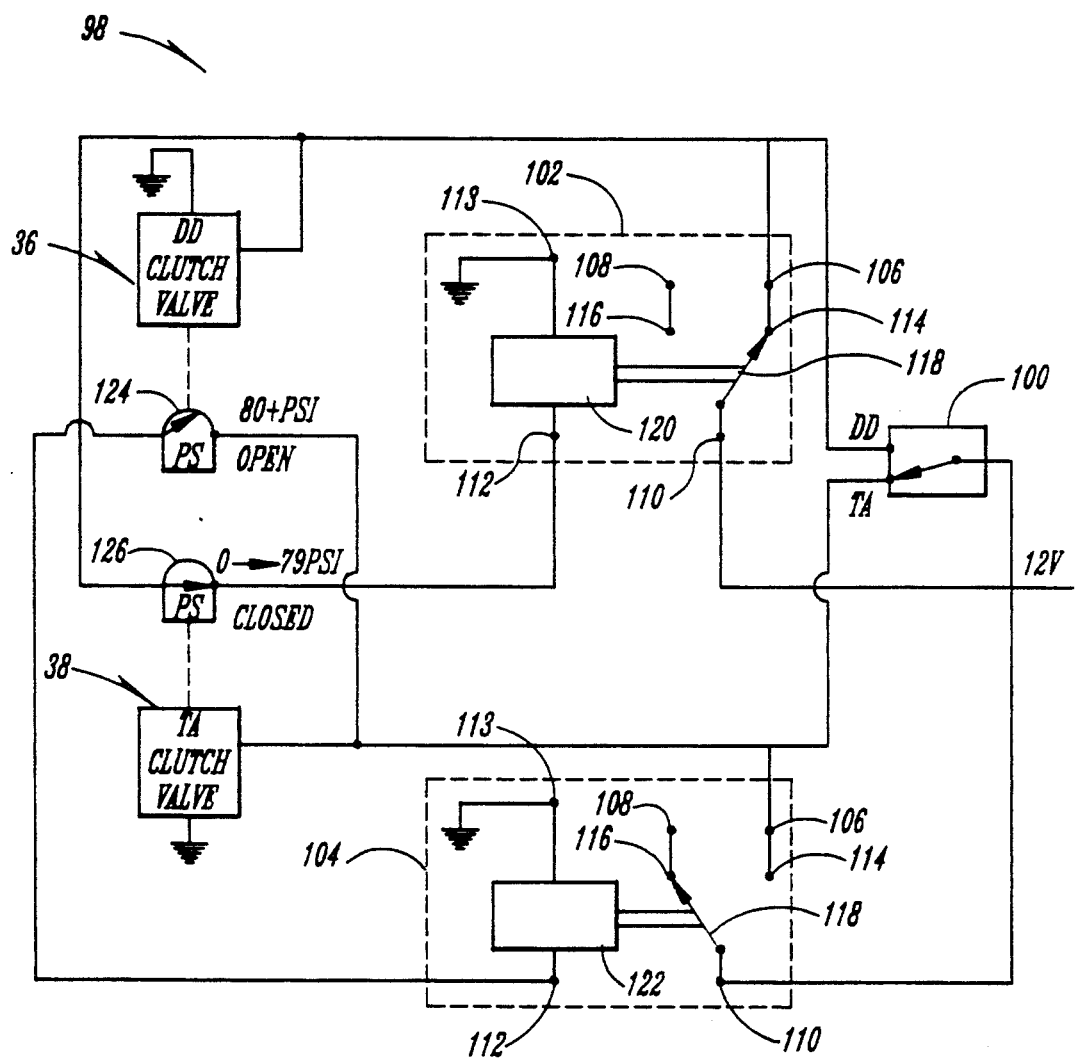
FIG. 8 is a view similar to FIG. 6 and 7, but showing the condition of the control circuit immediately after the master switch has been moved to its torque amplifier position and before pressure within the torque amplifier clutch has built up to 80 psi.

FIG. 8 shows the condition of the circuit immediately after the master switch 100 has been moved from its direct drive position to its torque amplifier position. In this condition, the movable contact 118 of relay 102 remains in its closed position by virtue of the pressure switch 126 being in its normally closed position. Therefore, the direct drive clutch remains in its engaged position even though the master switch 100 has been moved from its direct drive position to its torque amplifier position. This condition remains so long as the fluid pressure being delivered to the torque amplifier clutch has not reached 80 psi.

Figure 9:
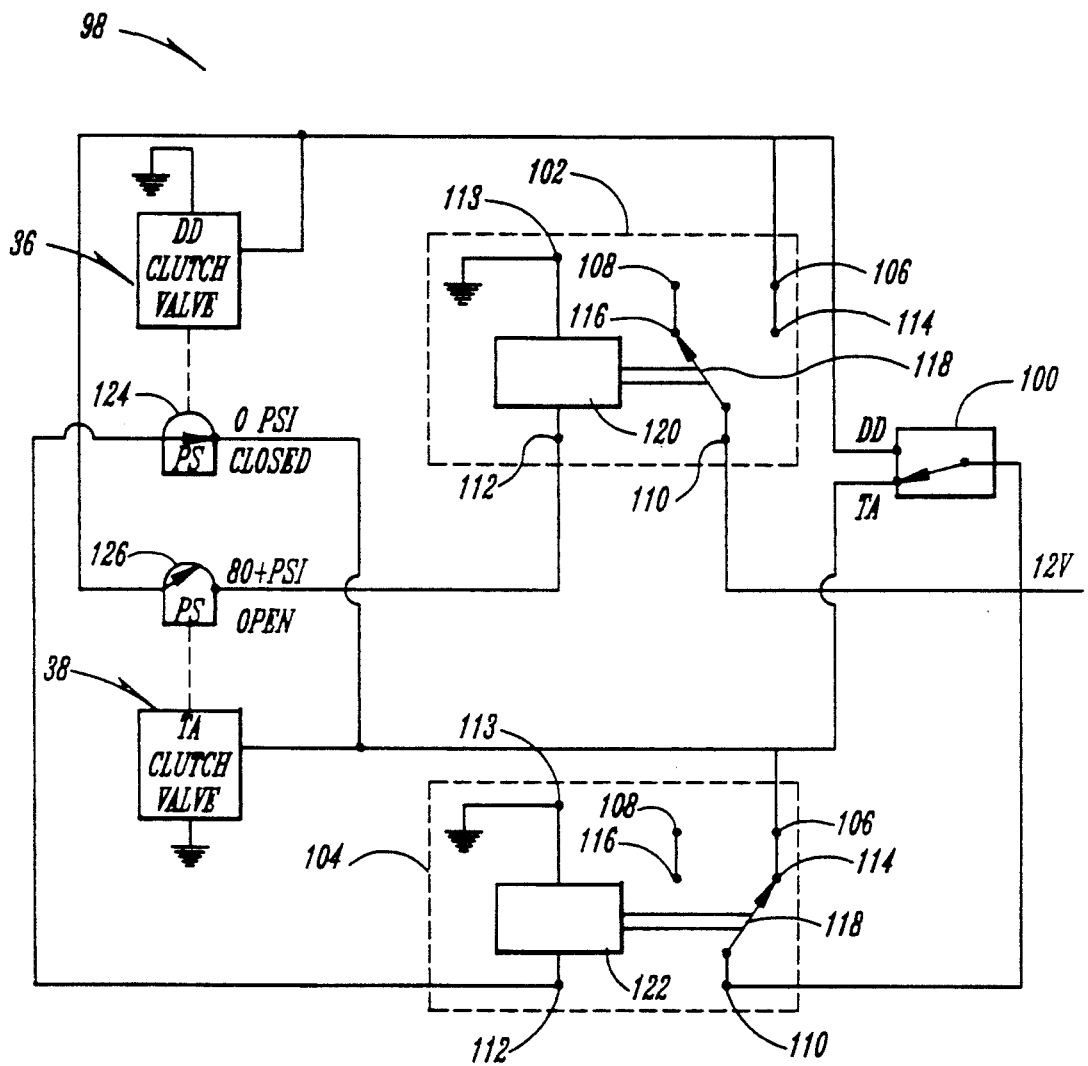
FIG. 9 is a view similar to FIGS. 6-8, but showing the condition of the circuitry with the master switch in the torque amplifier position and with the fluid pressure within the torque amplifier clutch exceeding 80 psi.

FIG. 9 illustrates the condition of the circuit after the fluid pressure being delivered to the torque amplifier clutch reaches or exceeds 80 psi. At that point, the pressure switch 126 moves to its open position thereby deactuating the relay coil 120 and causing the movable contact 118 to move to its open position. This shuts off electrical current from the power source to the direct drive clutch valve 36, thereby causing the direct drive clutch 30 to move to its disengaged position.

Figure 10:
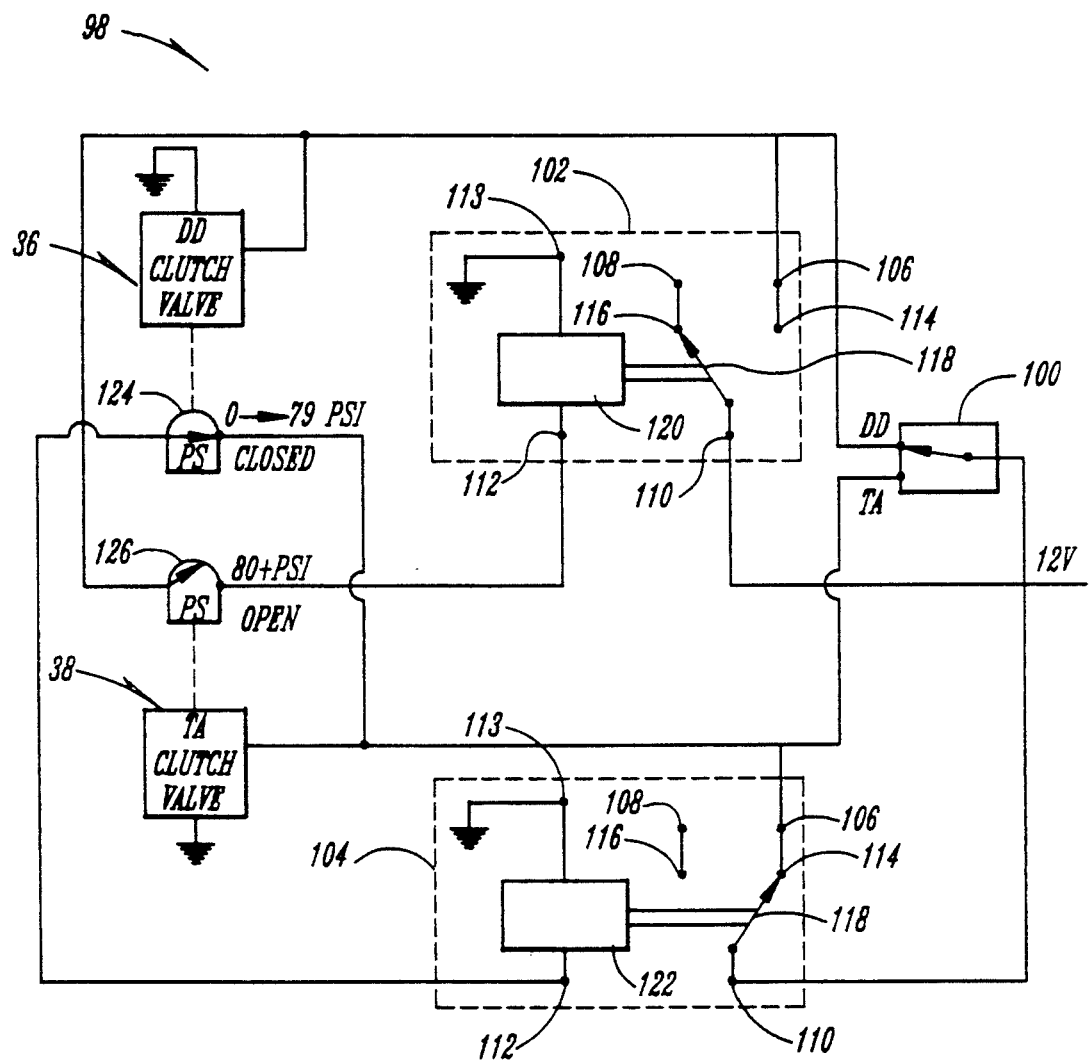
FIG. 10 shows the condition of the circuitry immediately after the master switch has been moved from the torque amplifier position to the direct drive position, and with the direct drive clutch being exposed to fluid pressure less than 80 psi.

FIG. 10 shows the condition of the circuit when the master switch 100 is returned to its direct drive position. In this condition, the relay coil 122 remains activated by virtue of the closed position of pressure switch 124. However, when the pressure within the direct drive clutch builds to greater than 80 psi, the pressure switch 124 moves to its open position thereby deactuating the relay coil 122 and causing the contact 118 of relay 104 to move to its open position. This deactuates the torque amplifier clutch valve 38 and causes the torque amplifier clutch 32 to move to its disengaged position.

The circuitry of FIGS. 6–10 accomplishes the same result as the circuitry of FIGS. 1–5, namely maintaining both clutches engaged during the transfer from one clutch to the other until the transfer is complete and pressure has built up to 80 psi. The primary differences between the systems of FIGS. 1–5 and the system of FIGS. 6–10 is that the relays in FIGS. 6–10 are spring biased to their open position and the pressure switches in FIGS. 6–10 are normally in their closed position and move only to their open position upon sensing fluid pressure of 80 psi or greater. In contrast, the relay of FIGS. 1–5 remains in whatever its condition happens to be until such time as one of the two relay coils is actuated. The pressure switches of the circuitry shown in FIGS. 1-5 are normally in an open position, and only move to their closed positions in response to sensing pressure exceeding 80 psi or more.

Thus it can be seen that the device accomplishes at least all of its stated objectives.

What is claimed is:

1. A control system for a drive train comprising a direct drive clutch and a torque amplifier clutch each of which is biased to a disengaged position and each of which is movable to an engaged position in response to the introduction of fluid pressure thereto, said control system comprising:

a fluid pressure source;

first valve means movable to an open position for introducing fluid pressure from said fluid pressure source to said direct drive clutch for causing said direct drive clutch to move to said engaged position, said first valve means being biased to a closed position for shutting off fluid pressure to said direct drive clutch;

second valve means movable to an open position for introducing fluid pressure from said fluid pressure source to said torque amplifier clutch for causing said torque amplifier clutch to move to said engaged position, said second valve means being biased to a closed position for cutting off fluid pressure from said torque amplifier clutch;

a valve control circuit connected to said first and second valve means for selectively moving said first and second valve means against said bias from said closed to said open positions;

said valve control circuit including master circuit means movable between a direct drive position for moving only said first valve means to said open position and a torque amplifier position for moving only said second valve means to said open position;

said valve control circuit including first delay circuit means capable of maintaining said direct drive valve means in said open position after said master circuit means moves from said direct drive position to said torque amplifier position;

said valve control circuit including a second delay circuit means capable of maintaining said torque amplifier valve means in said open position after said master circuit means moves from said torque amplifier position to said direct drive position;

said first and second delay circuits including first and second pressure control means respectively;

said first and second pressure control means being connected to said direct drive clutch and said torque amplifier clutch respectively for sensing when the fluid pressure being delivered thereto exceeds a predetermined value;

said first pressure control means being responsive to the delivery of fluid pressure above said predetermined value to said direct drive clutch for causing said first delay circuit means to cease maintaining said torque amplifier valve means in said open position; and said second pressure control means being responsive to the delivery of fluid pressure above said predetermined value to said torque amplifier clutch for causing said second delay means to cease maintaining said direct drive valve means in said open position;

relay means connected to said first and second delay circuit means and being movable from a first relay position for causing said first delay circuit means to maintain said first valve means in its said open position to a second relay position for causing said second delay circuit means to maintain said second valve means in its said open position;

an electrical power source;

said first pressure control means comprising a first pressure sensitive switch connected between said electrical power source and said relay means and movable between first and second switch positions for causing said relay means to move between said first and second relay positions;

said second pressure control means comprising a second pressure sensitive switch connected between said electrical power source and said relay means for causing said relay means to move between said first and second relay positions.

2. A control system according to claim 1 wherein said first and second pressure switches are each in an open position in response to sensing fluid pressure below said predetermined value and are in a closed position in response to sensing fluid pressure above said predetermined value.

3. A control system according to claim 1 wherein said first and second valve means each comprise a fluid valve and an electrical power means for moving said fluid valve from said closed to said open position.

4. A control system according to claim 3 wherein said master circuit means and said first delay circuit means are connected to said electrical power means of said first power means, said master circuit means and said second delay circuit means being connected to said power means of said second valve means.

* * * * *